United States Patent [19]
Davis et al.

[11] Patent Number: 6,091,361
[45] Date of Patent: Jul. 18, 2000

[54] METHOD AND APPARATUS FOR JOINT SPACE-TIME ARRAY SIGNAL PROCESSING

[76] Inventors: Dennis W. Davis, 207 E. Woodward Ave., Eustis, Fla. 32726; Jaime R. Román, 2250 Quail Ridge, Palm Beach Gardens, Fla. 33418; James H. Michels, 2 University Dr., Clinton, N.Y. 13323

[21] Appl. No.: 09/076,395

[22] Filed: May 12, 1998

[51] Int. Cl.$^7$ .............................. G01S 3/16; G01S 13/00
[52] U.S. Cl. ............................................ 342/378; 342/195
[58] Field of Search ...................................... 342/378, 195

[56] References Cited

U.S. PATENT DOCUMENTS 5,640,429  6/1997  Michels et al. ......................... 342/378
5,652,594  7/1997  Costas .................................... 342/195

*Primary Examiner*—Gregory C. Issing

[57] ABSTRACT

Processing methods and associated hardware architectures for the spatio-temporal processing of phased array sensor signals are disclosed. The processing method employs a joint spatio-temporal domain processing approach. The disclosed method is an optimal estimation scheme which exhibits significantly reduced computational burden. Suppression of interference sources at angles-of-arrival other than the desired signal is achieved implicitly. The associated system architecture provides not only the ability to achieve good joint angle-Doppler estimates, but offers the ability to easily trade the relative performance in each domain. The disclosed approach emphasizes the use of multiple hypothesis testing with spatio-temporal whitening filters.

10 Claims, 9 Drawing Sheets

SPATIO/TEMPORAL (JOINT DOMAIN) CORRELATION STRUCTURE $$\underline{x} = \begin{bmatrix} \underline{x}(0) \\ \underline{x}(1) \\ \vdots \\ \underline{x}(N-1) \end{bmatrix} \qquad \mathcal{R} = E[\underline{x}\underline{x}^H] = \begin{bmatrix} R_{xx}(0) & R_{xx}(-1) & \cdots & R_{xx}(-N+1) \\ R_{xx}(1) & R_{xx}(0) & \cdots & R_{xx}(-N+2) \\ \vdots & \vdots & \ddots & \vdots \\ R_{xx}(N-1) & R_{xx}(N-2) & \cdots & R_{xx}(0) \end{bmatrix}$$

SPATIAL CORRELATION STRUCTURE $$\underline{x}(n) = \begin{bmatrix} x_1(n) \\ x_2(n) \\ \vdots \\ x_J(n) \end{bmatrix} \qquad R_S = E[\underline{x}(n)\underline{x}^H(n)]$$

TEMPORAL CORRELATION STRUCTURE $$\underline{x}_j = \begin{bmatrix} x_j(0) \\ x_j(1) \\ \vdots \\ x_j(N-1) \end{bmatrix} \qquad R_T = E[\underline{x}_j\underline{x}_j^H]$$

Fig. 2

METHOD AND APPARATUS FOR JOINT SPACE-TIME ARRAY SIGNAL PROCESSING

STATEMENT OF GOVERNMENT INTEREST

The invention described herein may be manufactured and used by the United States Air Force for governmental purposes without payment of any royalty theron.

BACKGROUND

1. Field of the Invention

This invention relates to phased array sensor systems with signal processing, such as are used with radar, sonar, seismic, medical and communication equipments. More specifically, it addresses means to improve detection of signals and suppression of interference sources in such systems.

2. Description of the Prior Art

Adaptive arrays are widely used in reducing the vulnerability of reception of desired signals to the presence of interfering signals. In prior art phased array radars for moving target indication, it is required to estimate target velocities while at the same time removing signals from unwanted directions. Such unwanted signals typically constitute jammers or localized interference sources and clutter. The combination of spatio-temporal processing which achieves these objectives is referred to as angle-Doppler processing. This is achieved by either cascade processing of signals in the space and time domains sequentially or by joint domain processing. With respect to sequential processing in the spatial domain, the signals from each antenna array element are weighted to achieve the desired effective antenna pattern (beamforming). This establishes the antenna beamwidth and look direction(s). This process also provides for the placement of nulls in the antenna pattern at angles associated with unwanted signals. The temporal domain processing typically involves parallel processing of the signal through a Doppler filter bank for estimation of target velocity. Conventional joint domain methods determine a weight vector of large dimensionality which is applied to the total incoming signal. It is known that although cascade processing is computationally less burdensome than joint domain processing, it is suboptimal with respect to accuracy of performance.

Conventional Sensor Array Processors

In contrast to prior art methods of joint domain processing the presently disclosed joint-domain processing architecture offers much reduced computational burden while at the same time offering new insight into the nature of spatio-temporal filtering in the multichannel case.

In array systems employing recursive adaptation methods, a fundamental tradeoff exists between the rate of change of non-stationary noise/interference fields and the steady state performance of the adapted system. Furthermore in radar and in communications applications there can be an interaction between spatial filter (array weights) adaptation performed at high rates and the signal modulation. A favored approach to avoid array adaptation transients in conventional sensor array systems is to invert an estimate of the covariance of the multichannel data vector (direct matrix inversion—DMI). This requires increased computational burden in comparison with recursive methods. The presently disclosed invention makes use of an inherently non-recursive method which is computationally more efficient than the DMI approach.

Space/Time Processing

Consider a coherent radar system with J spatial channels (each channel is the output of either an individual array element or a sub-array composed of multiple array elements), as indicated in FIG. 1. In a surveillance scenario (see, for example, A. G. Jaffer, M. H. Baker, W. P. Ballance, and J. R. Staub, Adaptive Space-Time Processing Techniques for Airborne Radars, RL Technical Report No. RL-TR-91-162, Rome Laboratory, Griffiss AFB, N.Y., 1991., or M. Rangaswamy, P. Chakravarthi, D. Weiner, L. Cai, H. Wang, and A. Ozturk, Signal Detection in Correlated Gaussian and Non-Gaussian Radar Clutter, RL Technical Report No. RL-TR-93-79, Rome Laboratory, Griffiss AFB, N.Y., 1993), the J-element, discrete-time, baseband, complex-valued, finite-duration, vector sequence $\{x(n)|n=0, 1, \ldots, N-1\}$ is the return from the radar resolution (range-azimuth) cell received at each of the J channels for the duration of the coherent processing interval (CPI), which consists of N data points. In the context of a hypothesis testing formulation, the null hypothesis, denoted as $H_0$, corresponds to the case of target absent; the alternative hypothesis, denoted as $H_1$, corresponds to the case of target present. Under the null hypothesis, the vector sequence $\{x(n)\}$ contains clutter, interference, and noise. Under the alternative hypothesis, $\{x(n)\}$ also contains target information. The vector sequence is assumed to be zero-mean and Gaussian-distributed under both hypotheses.

In the space-time processing application the objective is to detect the target while canceling the spatial interference and clutter. Conventional means to accomplish this objective determine a set of JN complex-valued weights that are applied to the radar return sequence $\{x(n)\}$. These weights implement a beam pattern with nulls placed as close as possible (subject to physical beam pattern constraints) to the direction of arrival of the incoming clutter and interference. These weights also place nulls in the temporal frequency response corresponding to the center Doppler frequency of the clutter and interference.

In the aforementioned reference by Rangaswamy et al., the conventional space-time processing configurations for the detection of a moving target are classified into the following three major categories:

(a) optimum joint-domain configuration, (b) space-time configuration, and (c) time-space configuration.

The relevant data vector and covariance matrix definitions for these configurations are presented in FIG. 2. In the optimum joint-domain configuration a spatio-temporal performance criterion (minimum mean-square) is formulated and optimized jointly (for the space and time domains). This results in a JN-dimensional weight vector which is used to generate a dot product with the JN-dimensional vector x formed by concatenating the N random vectors $\{x(n)|n=0, 1, \ldots, N-1\}$, as defined in FIG. 2. A block diagram for this configuration is presented in FIG. 3 for the case of a known signal, as discussed in the aforementioned reference by Rangaswamy et al.

The other two configurations are approximations to the optimal configuration, based on formulating the problem as a cascade of two separate problems. In the space-time configuration a spatial-domain (beamforming) problem is addressed first, and then a temporal-domain problem (Doppler filter bank) is addressed. An optimum solution is obtained for each of the two separate problems, and the solutions are applied sequentially to the data, as indicated in FIG. 4 (also for the case of a known signal). In the time-space configuration the Doppler filter bank precedes the beamformer. A block diagram for the time-space configuration is presented in FIG. 5 for the known signal case.

Each of the configurations listed above admits approximations defined to reduce the computational burden. This is true even for the space-time and time-space configurations, which are themselves approximations to the optimum joint-domain approach. Two important approximations to the optimum approach are the "block sliding" algorithm proposed in the aforementioned reference by Jaffer et al., and the joint-domain localized generalized likelihood ratio (JDL-GLR) proposed in the aforementioned reference by Rangaswamy et al.

Sensor systems employing what are known as sidelobe cancellers typically fall into the space-time processing architecture category. Such systems consist of a main antenna with high gain and an array of auxiliary antennas with associated channels. The auxiliary antennas are designed so their gain patterns approximate the average sidelobe level of the main antenna gain pattern. The auxiliary antennas can then provide replicas of interfering signals which appear in the sidelobes of the main antenna. These replica signals can then be used to cancel interference in the main antenna. The use of appropriately calculated weights for the auxiliary channels constitutes a spatial filtering process. All Doppler processing is conducted subsequent to the spatial cancellation achieved through use of the auxiliary array.

Recent U.S. Pat. No. 5,216,640 to Donald et al. is an example of a time-space architecture for application to sonar. In the invention, multichannel data is provided by an array of hydrophones. The vector time sequences of each data channel are Fourier transformed and a cross spectral density matrix is then calculated using the resulting spectrum vectors for each channel. Subsequently, inverse beamforming methods are used to process the cross spectral density matrix to form a continuous angle-Doppler map. The inverse beamforming methods taught involve computationally intensive integral calculations and the associated system is designed to track multiple targets without suppression of interfering sources.

SUMMARY OF THE INVENTION

The present invention is directed to a processing method and associated architecture for joint-domain processing of phased array sensor data. The heart of the method exploits a type of multichannel filtering which generates innovations-like vector sequences. The multichannel filtering provides spatial whitening which aids in the suppression of interference sources. Such joint-domain processing shall herein after be referred to as joint space-time processing. Each filter corresponds to a specific hypothesis under test The following terms serve to clarify and more particularly define the disclosed invention:

"Innovations" ideally refers to conventional Kalman filtering definition of innovations and includes pseudo-innovations associated with sequences that depart from Gaussian-distributed statistics.

"Joint space-time processing" refers to processing of spatial and temporal (or angle and Doppler) information simultaneously.

"Likelihood ratio" refers to any of a number of ratios of conventional probabilistic likelihood functions used in statistical detection theory.

"Decision rule" is the rule which maps observed statistics into a decision space.

"Multichannel output data" refers to the collection of data which is output from each sensor with one channel corresponding to each such sensor.

"Hypothesis filter" refers to a filter which processes multichannel input data in such a way as to provide an indication of whether the input data corresponds to the hypothesis represented by the given filter.

"Spatial whitening" is a process whereby the covariance matrix of a multichannel data vector at a given instant in time is made to approach the structure of a diagonal matrix. This results in a decorrelation among the individual channels represented by the elements of the associated multichannel data vector.

"Temporal whitening" is a process whereby the covariance matrix formed from a vector of time sequence values for a single channel is made to approach the structure of a diagonal matrix. This results in a decorrelation in time of the sequence of data values associated with the given channel. In the present context of multichannel processing "temporal whitening" further implies that all channels of the multichannel data vector are so whitened.

OBJECTS AND ADVANTAGES

Several objects and advantages of the present invention are:

(a) to provide a multichannel sensor processing system which achieves space-time processing of sensor data for signal detection in a computationally efficient manner;

(b) to provide a multichannel sensor processing system which inherently suppresses interference sources independently of angle-of-arrival;

(c) to provide a multichannel sensor processing system which competes with the conventional null steering method of direct matrix inversion in avoiding null steering adaptation transients;

(d) to provide a multichannel sensor processing system which inherently suppresses both narrowband and broadband interference sources in a manner which is optimal for each;

(e) to provide a multichannel sensor processing system which in addition to inherent interference suppression provides angle-of-arrival estimates for the interfering sources;

(f) to provide a multichannel sensor processing system which inherently suppresses multipath interference;

(g) to provide a multichannel sensor processing system which avoids the partial loss of signal information in conventional cascade space-time processors;

(h) to provide a multichannel sensor processing system which can perform space-time processing for the purpose of source discrimination in a multiple hypothesis context;

(i) to provide a multichannel sensor processing system which can perform space-time processing for the case of passive as well as active sensors;

DRAWING FIGURES

In the drawings, closely related figures have the same number but different alphabetic suffixes.

FIG. 2 is a tabular presentation of data vector and correlation structure definitions for the three conventional space-time processing architectures.

DETAILED DESCRIPTION OF THE INVENTION

Model-Based Configuration for Space/Time Processing

Figure 1:
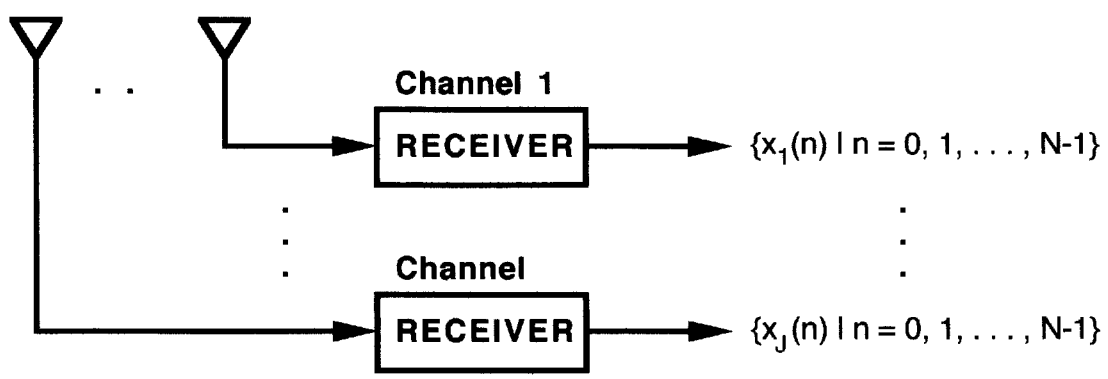
FIG. 1 is a functional block diagram depicting a multichannel signal in a coherent surveillance radar system.
Figure 3:
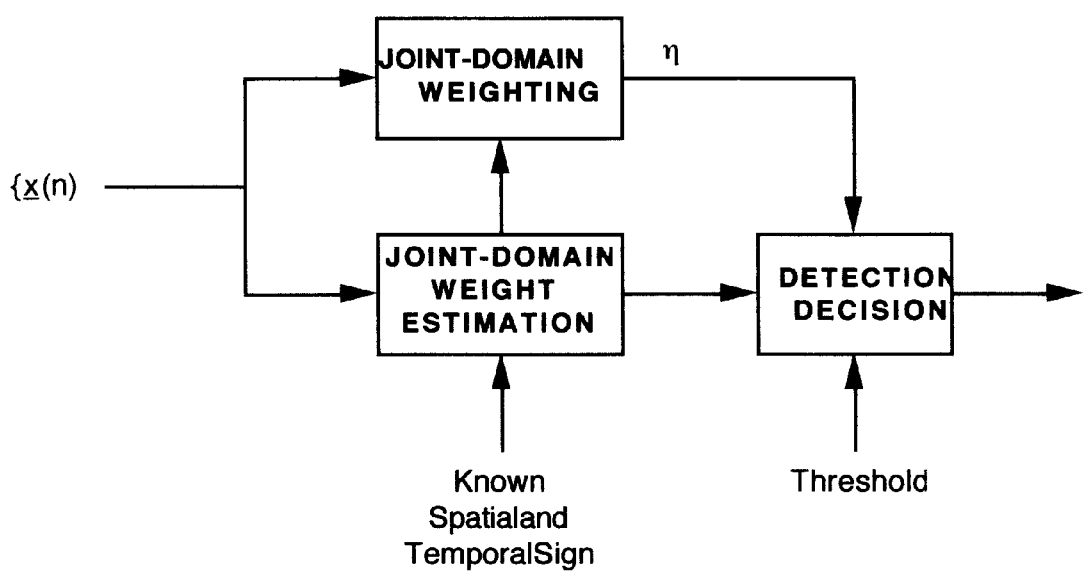
FIG. 3 is a functional block diagram of a joint domain processing architecture.
Figure 4:
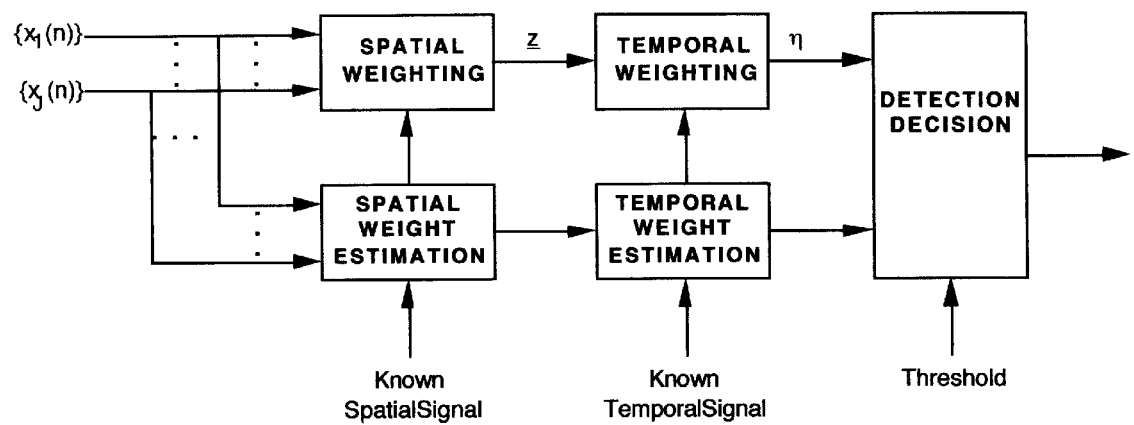
FIG. 4 is a functional block diagram of a space-time processing architecture.
Figure 5:
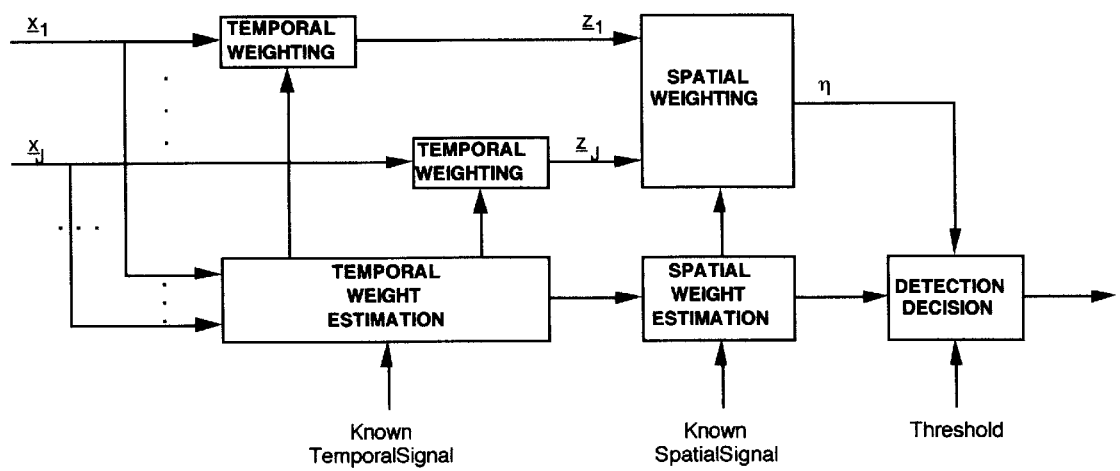
FIG. 5 is a functional block diagram of a time-space processing architecture.
Figure 6:
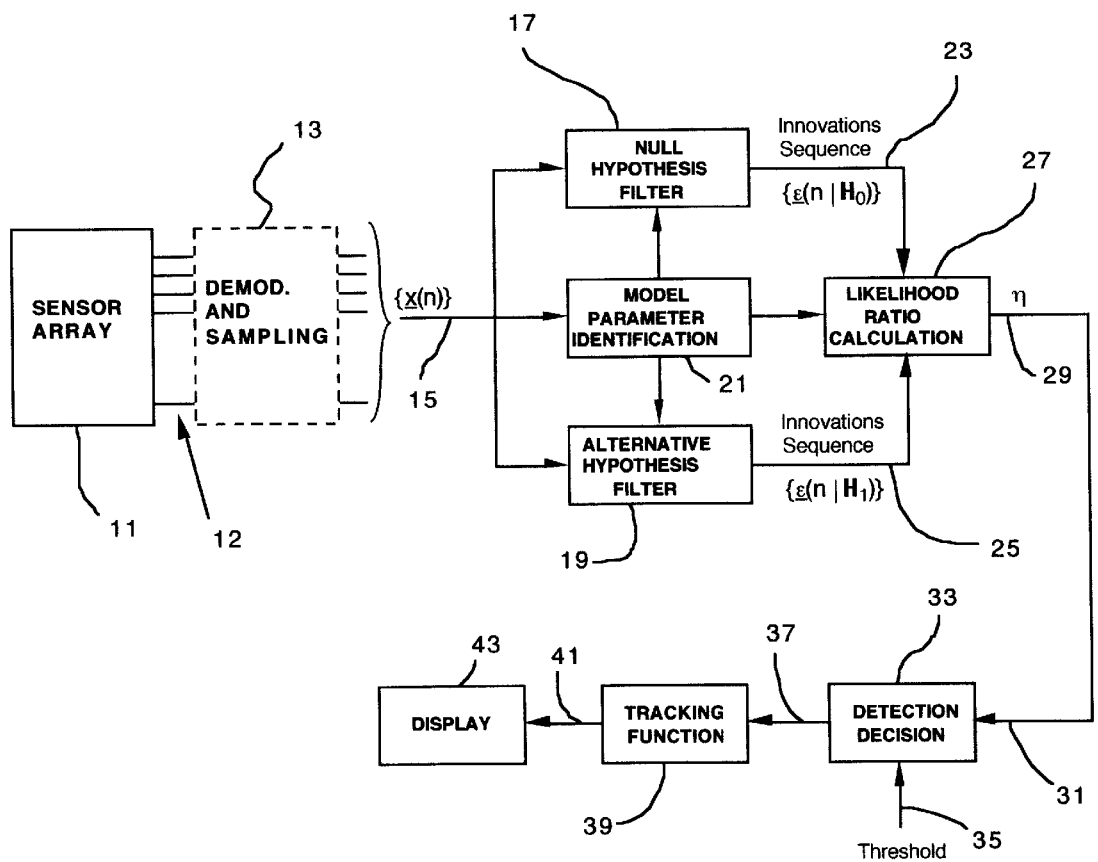
FIG. 6 is a functional block diagram of a sensor array system which makes use of a multichannel model-based, binary hypothesis detection architecture.

The presently disclosed invention comprises a model-based multichannel detection architecture for space-time processing of sensor array data. A block diagram for this architecture is presented in FIG. 6 which depicts a binary hypothesis test scheme. The input sensor array 11 provides multiple channels of sensor data 12 which are formatted in a way which depends on the particular type of sensor system. The next functional block of FIG. 6 is shown dashed to indicate the optional forms this function may assume among sensor types. In the case of a radar system the multichannel data 12 is fed to demodulation and sampling function 13. This function can include down conversion to some intermediate frequency band or baseband. In the case of a sonar system, functional block 13 may omit the down-conversion requirement. The output of the functional block 13 is in the form of a vector sequence $\{x(n)\}$ of data samples 15 corresponding to the sensors of array 11, where n is the time index. The vector sequence 15 is input in parallel fashion to a null hypothesis (signal absent) filter 17 and an alternative hypothesis (signal present) filter 19. The filters 17 and 19 are multichannel filters having the number of filter inputs and outputs corresponding to the number of array sensors or channels. The filter parameters are determined either offline or online by the model parameter identification function 21. The particular vector innovations sequence 23 or 25, $\{v(n|H_i)\}$, is uncorrelated in time as well as in space for the signal path corresponding to the hypothesis which is true, and is correlated in time and in space for the signal path corresponding to the hypothesis which is false. This difference is quantified by the likelihood ratio calculation 27. The result is sufficient to allow making the detection decision and providing a corresponding output 29 by means of the decision rule implemented in decision function 33. The false alarm rate can be established by means of an adjustable threshold input 35. Of course, the vector sequence $\{v(n|H_i)\}$ is a true innovations only for the signal path corresponding to the true hypothesis. A sequence of detections 37 is fed to a tracker 39 which establishes target track files and outputs target data 41 to a display 43.

As discussed below, the novelty and major advancement of the presently disclosed invention over prior art architectures is the exploitation of particular hypothesis filters utilized in a multiple hypothesis architecture. These filters are multichannel temporal model filters which achieve both spatial and temporal whitening of the associated filter outputs. The spatial whitening accomplishes the same suppression of angularly-distributed interference sources as does null steering in conventional beamforming systems.

Figure 7:
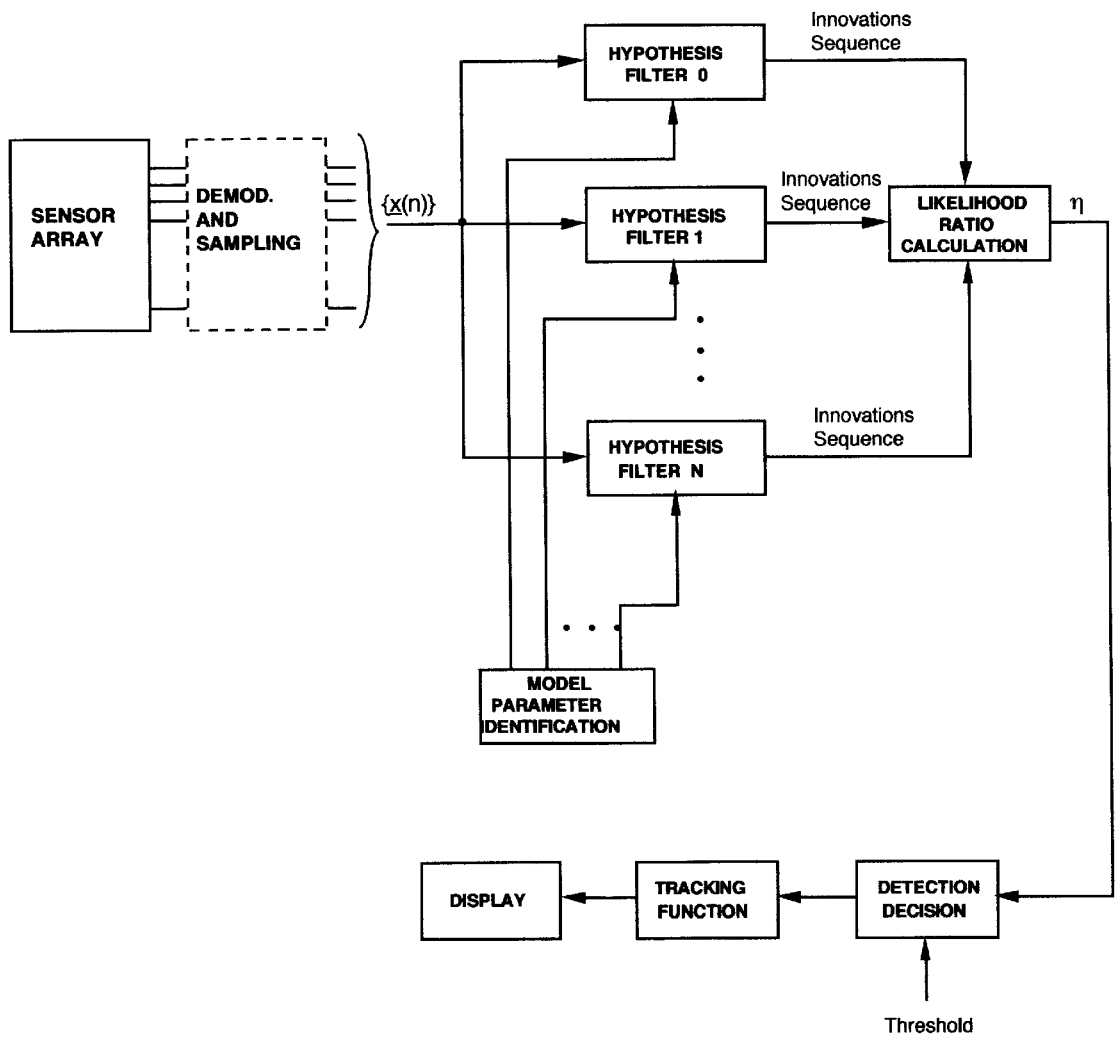
FIG. 7 is a functional block diagram of a sensor array system which makes use of a multichannel model-based, multiple hypothesis detection architecture.

The architecture is generalized in FIG. 7 for the case of discrimination among multiple hypotheses. This architecture addresses the presence of variable clutter and interference conditions as well as targets of significantly different character. The various hypothesis filters 44 can be on-line adaptive to allow the system to remain robust to non-stationarity of targets and interference.

A number of likelihood ratio test formulations well known in the prior art can be implemented satisfactorily in the calculation block 27 of FIG. 6. However, a preferred formulation is that first developed by Metford et al. for innovation-based signal detection in the references P. A. S. Metford, S. Haykin, and D. Taylor, "An Innovations Approach to Discrete-Time Detection Theory," IEEE Trans. on Information Theory, Vol. IT-28, No. 2, March 1982 and P. A. S. Metford, "An Innovations Approach to Discrete-Time Detection Theory with Application to Radar," Ph.D. Thesis, McMaster University, September 1984 and generalized for multichannel application in J. H. Michels, Multichannel Detection Using the Discrete-Time Model-Based Innovations Approach, RL Technical Report No. RL-TR-91-269, Rome Laboratory, Griffiss AFB, N.Y., 1991.

Filter Models

The model-based approach to multichannel detection involves processing the channel data to identify the parameters of a model for the multichannel system, and determination of a detection decision utilizing the identified parameters to filter the channel data. Channel data is partitioned into design and test data. Design data represents actual truth data corresponding to a given hypothesis. The model parameters associated with the given hypothesis filter are identified from this design data. The collection of test data represents that data for which the truthfulness of the various hypotheses is to be assessed. Model parameters can be identified on-line, as the channel data is received and processed. Alternatively, the model parameters can be identified off-line for various conditions and stored in the processor memory to be accessed in real-time as required.

There are two general classes of linear parametric models for vector random processes: time series models and state space models. Time series models include moving-average (MA) models, auto-regressive (AR) models, and auto-regressive moving-average (ARMA) models. State space models are more general than time series models; in fact, MA, AR, and ARMA models can be represented by state space models. In the state space literature, the determination of the model parameters based on output data (and, sometimes, input data also) is referred to as a stochastic identification or a stochastic realization problem.

Time series models have been applied to the multichannel detection problem, and the performance results obtained provide encouragement for further research (see, for example, the aforementioned reference to Michels, and the references therein, and J. R. Roman and D. W. Davis, "Multichannel System Identification and Detection Using Output Data Techniques," RL Technical Report No. RL-TR-97-5, Rome Laboratory, Griffiss AFB, N.Y., 1997). The results obtained by Michels assume that the multichannel output process can be modeled as a vector AR process. The work by Roman et al. demonstrates the efficacy of state-space models. Given the generality of state-space models, it is preferable that the hypothesis filters of the presently disclosed invention be based on this model class. A further selection of the innovations representation within this model class is advantageous as will be discussed below.

State Space Model

The class of multiple-input, multiple-output state variable models can represent effectively the channel output process for radar applications. Consider a discrete-time, stationary, complex-valued, zero-mean, Gaussian random process $\{x(n)\}$ defined as the output of the following state space model representation for the system giving rise to the observed process, hereafter to be referred to as the initial system:

$$\underline{y}(n+1) = F\underline{y}(n) + G\underline{u}(n) \quad n \geq n_0$$

$$\underline{x}(n) = H^H \underline{y}(n) + D^H \underline{w}(n) \quad n \geq n_0$$

$$E[\underline{y}(n_0)] = \underline{0}_N$$

$$E[\underline{y}(n_0)\underline{y}^H(n_0)] = P_0$$

Here $n=n_o$ denotes the initial time (which can be adopted as 0 since the system is stationary). Also, y(n) is the N-dimensional state of the system with $y(n_o)$ a Gaussian random vector; U(n) is the J-dimensional, zero-mean, stationary, Gaussian, white input noise process; and w(n) is the J-dimensional, zero-mean, stationary, Gaussian, white measurement noise process. The output (or measurement) process {x(n)} is also a J-dimensional vector process. Matrix F is the N×N system matrix, G is N×J input noise distribution matrix, $H^H$ is the J×N output distribution matrix, $D^H$ is the J×J output noise distribution matrix, and $P_o$ is the correlation matrix of the initial state. All these matrices are time-invariant. Matrix $P_o$ is Hermitian ($P_o^H = P_o$, and all its eigenvalues are real-valued) and positive definite (all its eigenvalues are positive).

The initial system described by the equations above is assumed to be asymptotically stable, which means that all the eigenvalues of matrix F are inside the unit circle. Also, this system is assumed to be reachable and observable, which implies that the dimension N of the state vector (also the order of the system) is minimal (B. D. O. Anderson and J. B. Moore, Optimal Filtering, Prentice-Hall, Englewood Cliffs, N.J., 1979). That is, there is no system of lesser order which has identical input/output behavior. Lastly, this system is assumed to be minimum-phase (its zeros are also inside the unit circle). This last assumption implies that the system is defined uniquely by second-order statistics. The output distribution matrices are defined with the conjugate operator in order to have notation consistent with that of the single-output system case, where both H and D become vectors, and nominally vectors are defined as column vectors.

The input noise process correlation matrix is given as (all matrices defined hereafter have appropriate dimensions)

$$E[\underline{u}(k)\underline{u}^H(k)] = R_{uu}(0) = Q \quad k \geq n_0$$

$$E[\underline{u}(k)\underline{u}^H(k-n)] = R_{uu}(n) = [0] \quad k \geq n_0 \text{ and } n \neq 0$$

and the output noise process correlation matrix is given as $$E[\underline{w}(k)\underline{w}^H(k)] = R_{ww}(0) = C \quad k \geq n_0$$

$$E[\underline{w}(k)\underline{w}^H(k-n)] = R_{ww}(n) = [0] \quad k \geq n_0 \text{ and } n \neq 0$$

Notice that matrices Q and C are Hermitian. Matrix Q is at least a positive semidefinite matrix since it is an auto-correlation matrix (all the eigenvalues of a positive semidefinite matrix are non-negative), and matrix C is assumed to be positive definite (this can be relaxed to positive semidefinite, but positive definiteness is more realistic since in the radar problem w(n) represents channel noise and other such noise processes which are independent from channel to channel).

In the most general form for this model the input and output noise processes are correlated, with a cross-correlation matrix defined as $$E[\underline{u}(k)\underline{w}^H(k)] = R_{uw}(0) = S \quad k \geq n_0$$

$$E[\underline{u}(k)\underline{w}^H(k-n)] = R_{uw}(n) = [0] \quad k \geq n_0 \text{ and } n \neq 0$$

In general, matrix S is not Hermitian. Both the input and output noise processes are uncorrelated with the present and past values of the state process, and this is expressed in terms of cross-correlation matrices as $$E[\underline{y}(k)\underline{u}^H(k-n)] = R_{yu}(n) = [0] \quad k \geq n_0 \text{ and } n \geq 0$$

$$E[\underline{y}(k)\underline{w}^H(k-n)] = R_{yw}(n) = [0] \quad k \geq n_0 \text{ and } n \geq 0$$

The correlation matrix of the state is defined as $$E[\underline{y}(n)\underline{y}^H(n)] = R_{yy}(n) = P(n) \quad k \geq n_0 \text{ and } n \geq 0$$

It follows from the first set of four equations above describing the initial system and the above definitions that the state correlation matrix satisfies the following recurrence relation, $$P(n+1) = FP(n)F^H + GQG^H \quad n \geq n_0$$

In general, matrix P(n) is Hermitian and positive definite. Since the system is stationary and asymptotically stable, and since matrix Q is positive definite, then the following steady-state (large n) value exists for the recursion given by the equation immediately above:

$$P(n+1) = P(n) = P$$

Under steady-state conditions the initial recurrence relation above becomes a Lyapunov equation for the steady-state correlation matrix, $$P = FPF^H + GQG^H$$

The conditions for steady-state also insure that the solution to the equation immediately above exists, is unique (for the selected state space basis), and is positive definite (aforementioned reference to Anderson et al.). Matrix P(n) is unique for a given state space basis. However, if the basis of the input noise vector and/or the basis of the state vector are changed by a similarity and/or an input transformation, then a different state correlation matrix results from the equation immediately above.

The correlation matrix sequence of the output process {x(n)} is defined as $$E[\underline{x}(k)\underline{x}^H(k-n)] = R_{xx}(n) = \Lambda_n \quad \forall k \text{ and } n \geq 0$$

$$R_{xx}(-n) = R_{xx}^H(n) \quad \forall n$$

For the initial system, the correlation matrix $R_{xx}(n)$ can be expressed in terms of the system parameter matrices, which is the following factorized form, $$\Lambda_n = R_{xx}(n) = H^H F^{n-1} \Gamma \quad n > 0$$

$$\Lambda_n = R_{xx}(n) = \Gamma^H [F^{n-1}]^H H = \Gamma^H [F^H]^{n-1} H \quad n < 0$$

where matrix Γ denotes the following cross-correlation matrix $$\Gamma = E[\underline{y}(n)\underline{x}^H(n-1)] = R_{yx}(1) = FP(n)H + GSD \quad \forall n > 0$$

The correlation matrix sequence factorization given above is the key to most correlation-based stochastic realization algorithms. The zero-lag (n=0) output correlation matrix is $$R_{xx}(0) = H^H P(n) H + D^H C D = \Lambda_o$$

and matrix $R_{xx}(0)$ is Hermitian and at least positive semidefinite. In steady-state, P replaces P(n) in the two equations immediately above.

As can be inferred from the above relations, the system parameters {F, G, H, D, Q, C, S, P, Γ} completely define the second-order statistics (the correlation matrix sequence {$R_{xx}$(n)}) of the output process, and it is said that the initial system realizes the output correlation matrix sequence. Conversely, the second-order statistics of the output process provide sufficient information to identify the system parameters, although not uniquely. Since the output process has zero mean and is Gaussian-distributed, the second-order statistics define the process completely.

From the system identification (stochastic realization) point of view, the problem addressed herein can be stated as follows: given the output data sequence {x(n)} of the initial system, estimate a set of system parameters {F, G, H, D, Q, C, S, P, Γ} which generates the same output correlation matrix sequence as this initial system. Furthermore, the identified parameter set must correspond to a system realization of minimal order (with state vector y of minimal dimension). The solution to this problem is pursued herein via a two-step approach: first an estimate of the output correlation matrix sequence is calculated, and then the estimated correlation sequence is used to determine the system parameters.

It is well known (as in aforementioned reference to Anderson et al.) that there can be an infinity of systems described by the governing equations of the initial system that have the same output correlation matrix sequence. The set of all systems that have the same output correlation matrix sequence is an equivalence class, and any two systems belonging to the set are said to be correlation equivalent (J. V. Candy, Realization of Invariant System Descriptions from Markov Sequences, Ph.D. Dissertation, Department of Electrical Engineering, University of Florida, Gainesville, Fla., 1976). For example, the output correlation matrix sequence remains invariant to a similarity transformation applied to the state vector. Similarly, the output correlation matrix sequence remains invariant also to a non-singular transformation applied to the input noise and/or to the output noise. As shown in the aforementioned reference by Candy, the equivalence class of correlation equivalent systems is defined including other operations besides a change of basis.

As inferred from these comments, the solution to the system identification problem is not unique. It is also true that most of the possible system parameter solutions do not possess desirable properties. There is, however, a solution which has several features of importance. This solution is referred to as the innovations representation for the system, and is discussed next. The canonical correlations identification algorithm discussed below can be used to generate system parameter matrix estimates for the innovations representation.

In general, the system matrix parameters resulting from the identification algorithm will be represented in a different basis, and should be denoted with a different symbol (say, $F_1$ instead of F, etc.); nevertheless, the same symbol will be used in this disclosure in order to simplify notation.

Innovations Representation

The innovations representation for the system is a very powerful concept in the theory of linear stochastic systems due to its simplicity and its characteristics. Several texts and papers discuss this concept in detail; in particular, the aforementioned reference by Anderson et al. provides a lucid presentation. The discussion herein is adapted mostly from this reference by Anderson et al.

Consider a discrete-time, stationary, complex-valued, system of the form (hereafter referred to as the innovations model)

$$\underline{\alpha}(n+1) = F\underline{\alpha}(n) + K\underline{\varepsilon}(n) \quad n \geq n_0$$

$$\underline{\chi}(n) = H^H \underline{\alpha}(n) + \underline{\varepsilon}(n) \quad n \geq n_0$$

$$\underline{\alpha}(n_0) = \underline{0}_N$$

$$E[\underline{\alpha}(n_0)\underline{\alpha}^H(n_0)] = \Pi(n_0) = \Pi_0 = [0]$$

$$E[\underline{\alpha}(n)\underline{\alpha}^H(n)] = \Pi(n) \quad n > n_0$$

$$\Pi(n) = \Pi \text{ as } n \to \infty$$

where α(n) is the N-dimensional state, χ(n) is the J-dimensional output, and the input process {ε(n)} is a J-dimensional, zero-mean, white Gaussian process with correlation matrix structure given as $$E[\underline{\varepsilon}(k)\underline{\varepsilon}^H(k)] = R_{xx}(0) - H^H \Pi H = \Lambda_0 - H^H \Pi H = \Omega \quad k \geq n_0$$

$$E[\underline{\varepsilon}(k)\underline{\varepsilon}^H(k-n)] = [0] \quad k \geq n_0 \text{ and } n \neq 0$$

The state correlation matrix π(n) has a steady-state value because the system is asymptotically stable (stationary), and the steady-state value, π, is obtained as the limiting solution to the following recursion $$\Pi(n+1) = F\Pi(n)F^H + [F\Pi(n)H - \Gamma][\Lambda_0 - H^H \Pi(n)H]^{-1}[F\Pi(n)H - \Gamma]^H \quad n \geq n_0$$

$$\Pi(n_0) = \Pi_0 = [0]$$

Matrix K in the first equation above describing the innovations model system is given as $$K = [\Gamma - F\pi H]\Omega^{-1} = [\Gamma - F\pi H][\Lambda_o - H^H \pi H]^{-1}$$

$$K = GSD\Omega^{-1} = GSD[\Lambda_o - H^H \pi H]^{-1}$$

where the second relation follows from the definition of Γ in the initial system. In the cases where the inverse of the correlation matrix Ω does not exist, its pseudoinverse is used instead in the four equations immediately above.

Matrices F, H, $\Lambda_o$, and Γ are as defined for the initial system. That is, the innovations model system is related to the initial system. In fact, the innovations model system is the steady-state innovations representation for the initial system. This representation has the following important features.

(a) First and foremost, the innovations model is correlation equivalent to the general state space model (b) Among all correlation equivalent representations, the innovations representation exhibits the least uncertainty in the state estimate.

(c) This representation provides the one-step Kalman filter gain directly.

(d) The driving white noise process, $\{\epsilon(n)\}$, for the innovations representation is correlation equivalent to the innovations sequence of the initial system. This is the reason for referring to the latter system as the "innovations representation" for the initial system.

(e) The innovations model is causally invertible. This means that the present and past of the process $\{\epsilon(n)\}$ can be constructed from the present and past values of the output process $\{\chi(n)\}$. The converse statement is true also; that is, any causally invertible model is an innovations representation for some system.

(f) Matrix $F-KH^H$ in the inverted innovations model is a stable matrix. This follows from the fact that the matrix pair (F, H) is observable, and implies that the Kalman filter for the initial system is stable also.

(g) The transfer function of the innovations model is minimum phase. This is related to the fact that the innovations model is correlation equivalent to the initial system, and second-order moment information (the output correlation matrix sequence) does not contain any phase information.

(h) The innovations representation for a system of the form of the initial system is unique. Given that the innovations representation has the same output covariance sequence as the initial system, the fact that it is unique eliminates searching for other representations for the initial system with the properties listed herein.

(i) The innovations model can be computed from the output correlation matrix sequence of the initial system. This fact simplifies the parameter identification problem because the set of parameter matrices that must be estimated from the data is reduced to just five: $\{F, H, \Gamma, \pi, \Lambda_o\}$ (given these parameter matrices, the innovations covariance, $\Omega$, and the Kalman gain, K, are obtained using the equations immediately above.

Model Parameter Identification

In the case of time series models, two types of model parameter estimation algorithms have been established in the literature: (a) algorithms that operate on channel output correlation matrices, such as the extended Yule-Walker algorithm (in aforementioned reference by Michels), and (b) algorithms that operate on the channel output data directly (without the need to compute channel output correlation matrices), such as the Levinson-Wiggins-Robinson algorithm (R. A. Wiggins and E. A. Robinson,"Recursive Solution to the Multichannel Filtering Problem," Journal of Geophysical Research, Vol. 70, No. 8. pp. 435–441, 1965) and the Strand-Nuttall algorithm (O. N. Strand, "Multichannel Complex Maximum Entropy (Auto-Regressive) Spectral Analysis, IEEE Transactions on Automatic Control, 1977 and A. H. Nuttall, "Multivariate Linear Predictive Spectral Analysis Employing Weighted Forward and Backward Averaging: A Generalization of Burg's Algorithm," Naval Underwater Systems Center Tech Report No. TR-5501, New London, Conn.,1976).

An example of a state-space parameter identification algorithm which operates on channel output correlation matrices is the algorithm formulation due to Desai et al. (U. B. Desai, D. Pal, and R. D. Kirkpatrick, "A realiztion approach to stochastic model reduction," International Journal of Control, Vol. 42, No. 4, pp. 821–838, 1985). It based on the stochastic realization concepts developed by Akaike (H. Akaike, "Stochastic Theory of Minimal Realization," IEEE Transactions on Automatic Control, Vol. AC-19, No. 6, pp. 667–674, 1974,) and Faurre (P. L. Faurre, "Stochastic realization algorithms," in System Identification: Advances and Case Studies, R. K. Mehra and D. G. Lanoitis (eds.), Academic Press, N.Y., 1976). Roman and Davis (J. R. Roman and D. W. Davis,"State-Space Models for Multichannel Detection," RL Technical Report No. RL-TR-93-146, Rome Laboratory, Griffiss AFB, N.Y., 1993) have extended the formulation to the complex variable domain. This algorithm, hereinafter referred to as the canonical correlations algorithm, offers several advantages for multichannel detection applications, as listed next.

Identifies the parameters for a model in the state-space class, which is more general than the time series class.

An approximately balanced (in the stochastic sense) state space realization is generated, thus providing a built-in and robust mechanism for model order selection.

Identifies the innovations representation of the system and generates the state correlation matrix and the Kalman gain directly. Thus, the Kalman filter is obtained without having to solve a nonlinear discrete matrix Riccati equation.

Implementation of the algorithm involves the singular value decomposition (SVD), which is a stable numerical method.

These advantages are also offered by a state-space parameter identification algorithm which operates on the channel output data directly. The details of this algorithm are found in the reference J. R. Roman and D. W. Davis, "Multichannel System Identification and Detection Using Output Data Techniques," RL Technical Report No. RL-TR-97-5, Rome Laboratory, Griffiss AFB, N.Y., 1997. The canonical correlations algorithm will serve as an example means of computing the innovations model and will be discussed below.

The canonical correlations identification algorithm is based on the concept of the correlation structure between the past and future of the output process $\{x(n)\}$, in the context of Hilbert spaces of random variables (Akaike, 1975; Faurre, 1976). Consider the stochastic process $\{x(n)\}$ and define infinite-dimensional block vectors $x_P$ and $x_F$ as $$\underline{x}_P = \underline{x}(n-1; n-L) = \begin{bmatrix} x(n-1) \\ x(n-2) \\ \vdots \\ x(n-L) \end{bmatrix}$$

$$\underline{x}_F = \underline{x}(n; n+L-1) = \begin{bmatrix} x(n) \\ x(n+1) \\ \vdots \\ x(n+L-1) \end{bmatrix}$$

These vectors represent the past and future of the process with respect to time n. Note that the time n can be any instant of time because the process is stationary. Given these definitions, a number of matrices used in the canonical correlation algorithm can be defined. First, a stochastic Hankel matrix $H_{L,L}$ is defined as the following JL×JL block matrix, $$H_{L,L} = \begin{bmatrix} \Lambda_1 & \Lambda_2 & \cdots & \Lambda_L \\ \Lambda_2 & \Lambda_3 & \cdots & \Lambda_{L+1} \\ \vdots & \vdots & \ddots & \vdots \\ \Lambda_L & \Lambda_{L+1} & \cdots & \Lambda_{2L-1} \end{bmatrix}$$

where the block elements An are the elements of the sensor multichannel output correlation sequence:

$\Lambda_n = R_{xx}(n) = E[x(k-n+1)x^H(k+n)]$ $R_{xx}(-n) = R^H_{xx}(n)$ where superscript H denotes hermitian conjugate operator and E[ ] denotes the expectation. The column shifted (or row shifted) version of $H_{L,L}$ is $$\overleftrightarrow{H}_{L,L} = \begin{bmatrix} \Lambda_1 & \Lambda_2 & \cdots & \Lambda_L \\ \Lambda_2 & \Lambda_3 & \cdots & \Lambda_{L+1} \\ \vdots & \vdots & \ddots & \vdots \\ \Lambda_L & \Lambda_{L+1} & \cdots & \Lambda_{2L-1} \end{bmatrix}$$

Two additional matrices which use the same block elements are defined below $$R_{P:L,L} = E[\underline{x}_P \underline{x}_P^H] = \begin{bmatrix} \Lambda_0 & \Lambda_1 & \cdots & \Lambda_{L-1} \\ \Lambda_{-1} & \Lambda_0 & \cdots & \Lambda_{L-2} \\ \vdots & \vdots & \ddots & \vdots \\ \Lambda_{1-L} & \Lambda_{2-L} & \cdots & \Lambda_0 \end{bmatrix}$$

$$R_{F:L,L} = E[\underline{x}_F \underline{x}_F^H] = \begin{bmatrix} \Lambda_0 & \Lambda_{-1} & \cdots & \Lambda_{1-L} \\ \Lambda_1 & \Lambda_0 & \cdots & \Lambda_{2-L} \\ \vdots & \vdots & \ddots & \vdots \\ \Lambda_{L-1} & \Lambda_{L-2} & \cdots & \Lambda_0 \end{bmatrix}$$

where $R_{F:L,L}$ and $R_{P:L,L}$ are the JL×JL future and past block correlation matrices, respectively. Both of these matrices are Hermitian (as well as block Hermitian), and they exhibit a block Toeplitz structure (a block Toeplitz matrix is a matrix in which the (i,j)th block element is a function of i-j). It is important to note that, in general, the conjugate transpose of $R_{F:L,L}$ is not equal to $R_{P:L,L}$, even though these matrices are the block Hermitian of each other; that is, matrices $R_{F:L,L}$ and $R_{P:L,L}$ are not the element-by-element Hermitian of each other.

The canonical correlations algorithm can now be stated in the following ten step format:

Step 1. Select the number of block rows, L, in the Hankel matrix H such that JL>N (where N is the expected model order).

Step 2. Carry out a singular value decomposition on the JL×JL past block correlation matrix, and obtain a matrix square-root for this matrix $R_{P:L,L} = U_P S_P U_P^H = (U_P S_P^{1/2} U_P^H)(U_P S_P^{1/2} U_P^H) = R_P^{1/2} R_P^{1/2}$ Step 3. Carry out a singular value decomposition on the JL×JL future block correlation matrix, and obtain a matrix square-root for this matrix $R_{F:L,L} = U_F S_F U_F^H = (U_F S_F^{1/2} U_F^H)(U_F S_F^{1/2} U_F^H) = R_F^{1/2} R_F^{1/2}$ Step 4. Define a JL×JL matrix A as $A = R_F^{-1/2} H_{L,L} R_P^{-1/2} = (U_F S_F^{-1/2} U_F^H) H_{L,L} (U_P S_P^{-1/2} U_P^H)$ Step 5. Carry out a singular value decomposition on matrix A to obtain $A = U_A S_A V_A^H = R_F^{-1/2} H_{L,L} R_P^{-1/2}$ Step 6. Define the following JL×JL transformation matrices $T_{P-VA}^H R_P^{-1/2} T_F = U_A^H R_F^{-1/2}$ Step 7. Estimate the system matrix F as follows:

$$T_F \overleftrightarrow{H}_{L,L} T_P^H = \begin{bmatrix} Z_F & [0] \\ [0] & [0] \end{bmatrix}$$

$F = S_A^{-1/2} Z S_A^{-1/2}$

Step 8. Estimate the observation matrix H as follows. Let $Z_H$ denote the first J rows of matrix $H_{L,L} T_P^H$; then $H^H = Z_H S_A^{-1/2}$ Step 9. Estimate the backward model observation matrix Γ as follows. Let $Z_\Gamma$ denote the first J columns of matrix $T_F H_{L,L}$; then $\Gamma = S_A^{-1/2} Z_\Gamma$ Step 10. Determine the remaining system model parameters as follows:

$\Pi = S_A \quad \Omega = \Lambda_0 - H^H \Pi H \quad \Lambda_0 = \frac{1}{N_T - 1} \sum_{k=0}^{N_T-1} \underline{x}(k) \underline{x}^H(k)$ $K = [\Gamma - F\Pi H]\Omega^{-1} = [\Gamma - F\Pi H][\Lambda_0 - H^H \Pi H]^{-1}$ Generation of the Hypothesis Filters In the preferred embodiment of the present invention, an unknown system of the form of the initial system discussed above is modeled as an innovations representation. Thus, once the innovations model parameters have been identified by such means as delineated above, an optimal Kalman filter can be configured to generate the innovations sequence, {ε(n)}. As discussed below, this sequence can be linearly transformed to provide a spatially-whitened innovations sequence, {υ(n)}. Although either sequence can be used for the likelihood ratio calculations, the latter offers the prospect of improved detection performance. The approach described in this section is applied to the observation data under each of the two hypotheses.

Any one of several equivalent Kalman filter formulations can be applied to generate the innovations sequence. However, the one-step predictor formulation offers significant advantages in the context of the intended application (as per aforementioned reference to Anderson et al.). Specifically, the one-step predictor formulation generates the innovations sequence and the filter state update with a simple structure in the case where the input and output noises are correlated, and thus imposes less real-time computational requirements than other formulations. Also, the model identification algorithm generates the parameters for the innovations model. Thus, the one-step predictor formulation is adopted in this work. Strictly speaking, the terminology "one-step predictor" should be used hereafter, but use of the term "Kalman filter" is accepted universally. Both terms are used herein.

The steady-state one-step predictor formulation for the innovations model is a linear, time-invariant system described by the following equations:

$\hat{\underline{\alpha}}(n+1 | n) = F\hat{\underline{\alpha}}(n | n-1) + K\underline{\varepsilon}(n) \qquad n \geq n_0$ $\underline{\varepsilon}(n) = \underline{x}(n) - \hat{\underline{x}}(n | n-1) = \underline{x}(n) - H^H \hat{\underline{\alpha}}(n | n-1) \qquad n \geq n_0$ $\hat{\underline{\alpha}}(n_0 | n_0 - 1) = 0$ Here $\hat{\alpha}(n+1|n)$ is the estimate of the innovations model state vector at time n+1 based on observation data up to time n, $\hat{x}(n|n-1)$ is the estimate of the observation vector at time n based on observation data up to time n−1, and $\epsilon(n)$ is the innovations associated with the observation $x(n)$. Matrix K is the steady-state filter gain matrix. The filter initial condition is set equal to zero because the innovations model initial condition is zero. A block diagram of the Kalman filter is presented in FIG. 8, displaying the channel output vector as input, and the innovations sequence vector as output.

The steady-state filter is an approximation to the optimal time-varying filter. If the channel output process is in steady-state, this approximation provides acceptable performance. Additionally, the steady-state filter provides a significant reduction in the real-time computational requirements over the time-varying filter. Since the steady-state filter gain is used, it is necessary to neglect the first $N_i$ filter outputs (which represent undesirable transient effects) in the cases where the channel output process is not in steady-state conditions. The value of $N_i$ will depend upon the dynamics of the particular filter.

Anderson et al. show that the filter estimation error for an innovations model is zero at all times. That is, $$\hat{\alpha}(n+1|n) = \alpha(n+1)$$

Correspondingly, the filter estimation error correlation matrix is zero also. This can be inferred from the parallelism between the innovations model and the filter representation shown in FIG. 8. Thus, knowledge of the filter implies knowledge of the innovations model, and vice versa.

Figure 9:
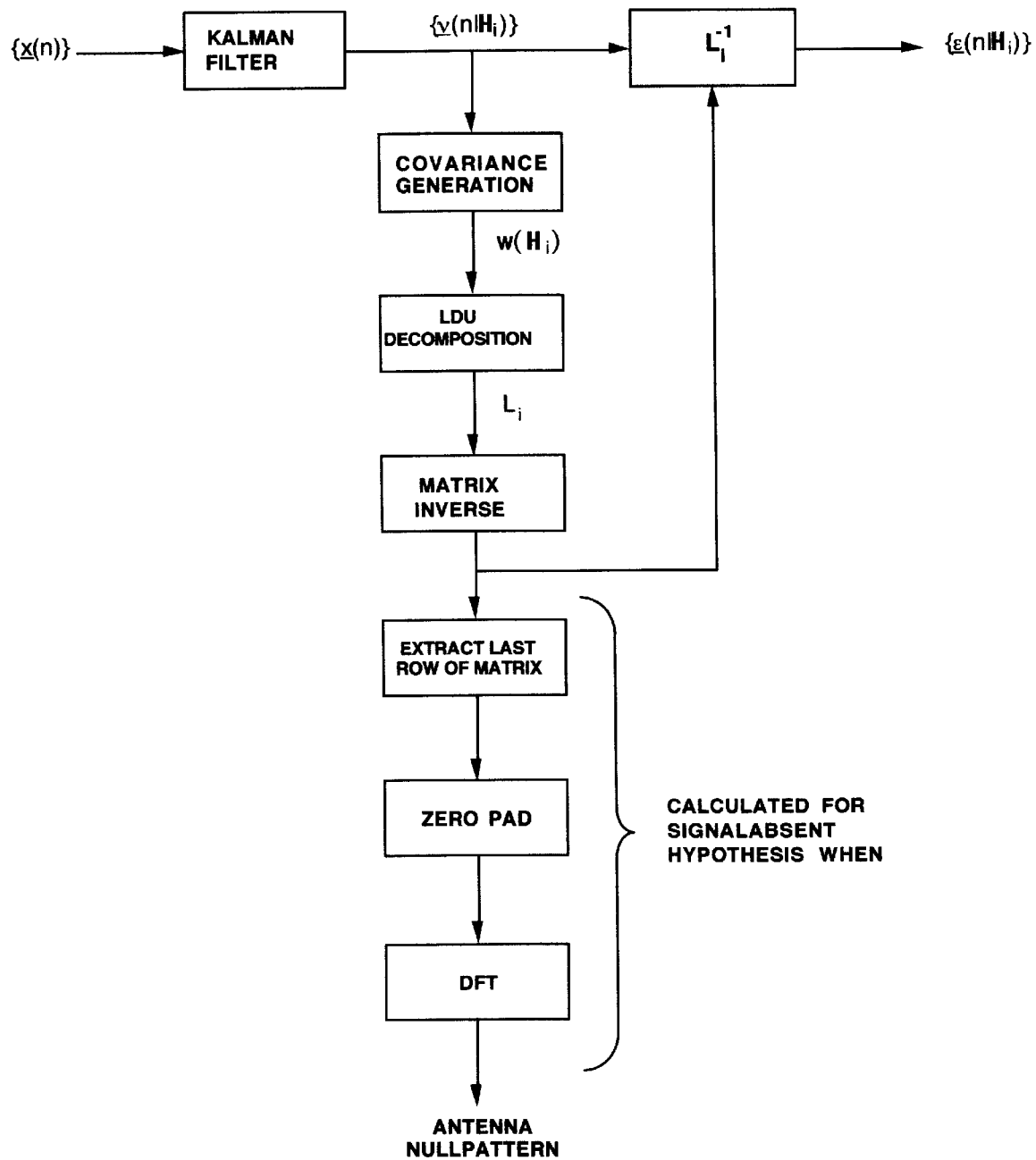
FIG. 9 is a functional block diagram showing the hypothesis filter as a two step linear process.

Each of the two filters in FIG. 6 can be viewed as a whitening filter for the respective case (null or alternative hypotheses). With respect to the path associated with the true hypothesis, it turns out that, in general, maximal whitening takes place in two steps, as indicated in FIG. 9. In the first step a Kalman filter 53 (or its associated whitening filter) operates on the input data vector 51 to generate an innovations sequence 55 which is uncorrelated in time. This sequence 55 is denoted as $\{\epsilon(n|H_i)\}$, and is referred to herein as the temporal innovations. The covariance matrix of the temporal innovations is $$\Omega(H_i) = E[\epsilon(n|H_i)\epsilon^H(n|H_i)]$$

and is estimated by use of the identified model parameters as per the equation above for $\Omega$ that uses the innovations model parameters.

Simulation results indicate that the temporal innovations 55 is less correlated in space than the radar return sequence at the filter input 51, $\{x(n)\}$. In other words, the cross-correlation coefficients of $\epsilon(n|H_i)$ are significantly smaller than the cross-correlation coefficients of $x(n)$. Consequently, the off-diagonal terms of the covariance matrix $\Omega(H_i)$ are significantly smaller than the off-diagonal terms of the covariance of $x(n)$, assuming both covariances are normalized (unit variances). This result, unappreciated in prior art occurs because the temporal filter is a multichannel operator which takes into consideration both temporal and spatial correlation information. The present invention exploits the spatial whitening as a means of suppressing interfering signals arriving from angles other than that of the desired signal. The degree of spatial correlation present in the temporal innovations is a function of various system parameters, including SNR. Under certain conditions, the residual spatial correlation is sufficiently small that a hypothesis filter can be based solely on this first step invoking multichannel Kalman filtering.

A likelihood ratio detector can be designed to operate on the spatially correlated innovations sequence residual. Alternatively, the residual can be whitened in space using a singular value decomposition, LDU, Cholesky, or other such decomposition, as discussed below. There is an advantage to using the LDU decomposition because of the spatial information gain achieved by doing so.

Figure 8:
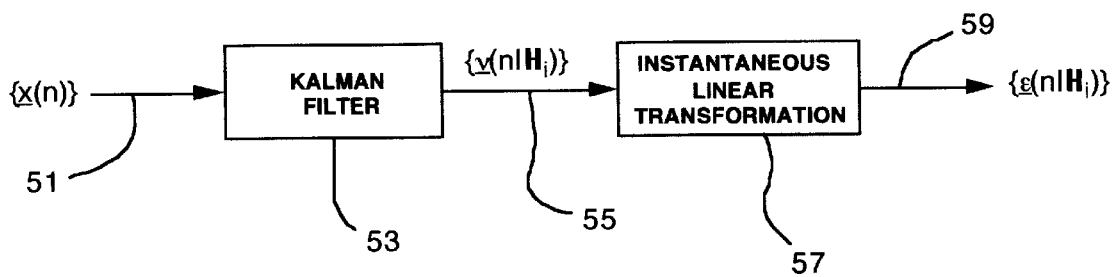
FIG. 8 is a Kalman filter block diagram, emphasizing the innovations sequence generation filter function.

In the second step depicted in FIG. 8 an instantaneous linear transformation 57 is applied to the temporal innovations vector 55 in order to generate the output innovations vector 59 as follows, $$v(n|H_i) = T_i^H \epsilon(n|H_i)$$

The complex-valued, non-singular, J×J transformation matrix $T_i$ is defined such that the covariance $\Omega(H_i)$ is diagonalized, $$\Sigma(H_i) = T_i^H \Omega(H_i) T_i$$

where $\Sigma(H_i)$ is the diagonal covariance matrix of the innovations $\{v(n|H_i)\}$. The diagonalization in the last equation can be carried out using the Cholesky factorization, the LDU decomposition, or the singular value decomposition (SVD). Diagonalization of the covariance is equivalent to spatial whitening of the sequence. In fact, in the reference C. W. Therrien, "On the relation between triangular matrix decomposition and linear prediction," Proceedings of the IEEE, Vol. 71, No. 12, pp. 1459–1460, 1983 it is shown that the LDU decomposition is related directly to optimal linear prediction, as summarized next.

The covariance matrix $\Omega(H_i)$ admits an LDU decomposition, which is a factorization of the form $$\Omega(H_i) = L_i D_i L_i^H$$

where $L_i$ is a J×J lower-triangular complex-valued matrix with 1's on the main diagonal, and $D_i$ is a diagonal real-valued matrix. Then, from Equations last two equations, $$T_i^H = L_i^{-1}$$

$$\Sigma(H_i) = D_i$$

The aforementioned reference by Therrien shows that the rows of matrix $L_i^{-1}$ correspond to the coefficients (in reverse order) of the optimum linear prediction filters of orders 0 through J−1, and the diagonal elements of $D_i$ are the corresponding prediction error variances. It follows from Equations for epsilon and T h above(2) and (5) that $$v(n|H_i) = L_i^{-1} \epsilon(n|H_i)$$

We claim:

1. A method of processing observed sensor array data to establish which among a plurality of hypotheses are true concerning said data, said data partitioned into sets of design data, each said set having a high probability of corresponding to one of said hypotheses, and test data that is to be tested for the truthfulness of each said hypothesis concerning said test data, said method comprising the steps of:

(a) estimating the filter parameters for a plurality of differing multichannel hypothesis whitening filters from each corresponding said set of design data;

(b) filtering said time sequence of signal vectors by said plurality of hypothesis whitening filters in parallel fashion to create a corresponding plurality of data residuals, each said multichannel hypothesis filter corresponding to a temporal model of said sensor array data for a particular said hypothesis;

(c) selecting from among said data residuals the particular data residual which exhibits the greatest temporal and spatial whiteness, thereby declaring the corresponding hypothesis to be true concerning said test data.

2. A method as recited in claim 1 wherein said sensor array data comprises demodulated and time sampled data.

3. A method as recited in claim 1 wherein said multichannel hypothesis filters comprise multichannel Kalman filters.

4. A method as recited in claim 3 which includes the additional step of spatially filtering the data residual from each said Kalman filter, said spatial filtering achieved by premultiplying the data residual from each said Kalman filter by a matrix which is the inverse of the L matrix obtained by an LDU decomposition of the covariance of the said data residual output from the corresponding said Kalman filter, whereby said spatial filtering achieves maximal spatial whitening of said data residuals.

5. A method as recited in claim 4 wherein the inverse of one said L matrix is also used to determine the angles-of-arrival of interfering signals, the particular said L matrix obtained from the output of a particular said hypothesis filter which corresponds to the absence of a desired signal, the last row of said inverse L matrix providing spatial weights indicative of the angles-of-arrival of said interfering signals.

6. An apparatus for detecting and processing sensor array signals comprising:
 (a) input means for converting sensor array signals into sequential sample vectors of multichannel data;
 (b) processing means comprising a plurality of multichannel filters operating in parallel on said sequence of vectors of multichannel data, each said multichannel filter representative of a particular signal hypothesis, each particular said multichannel filter providing as output a vector sequence which exhibits significantly greater spatial and temporal whiteness than said input sequential vectors when said input multichannel data corresponds to the hypothesis of the particular said multichannel filter;
 (c) decision means responsive to the outputs of said filtering means for determining which of said hypotheses is correct.

7. An apparatus for detecting and processing sensor array signals as recited in claim 6 wherein said input means for converting sensor array signals into sequential sample vectors of multichannel data further comprises demodulation and sampling means.

8. An apparatus for detecting and processing sensor array signals as recited in claim 6 wherein said filters comprise multichannel Kalman filters.

9. An apparatus for detecting and processing sensor array signals as recited in claim 8 which includes the addition of a spatial filter following each said Kalman filter, each said spatial filter in the form of a matrix which premultiplies the output vector of each said Kalman filter, said matrix equal to the inverse of the L matrix obtained by an LDU decomposition of the covariance of the output of the corresponding said Kalman filter, said spatial filters achieving maximal spatial whitening of said Kalman filter output vector sequences.

10. An apparatus for detecting and processing sensor array signals as recited in claim 6 wherein said decision means further comprises likelihood ratio testing means and decision rule means.

* * * * *